US009083886B2

(12) United States Patent
Theuwissen (10) Patent No.: US 9,083,886 B2
(45) Date of Patent: Jul. 14, 2015

(54) DIGITAL CAMERA WITH FOCUS-DETECTION PIXELS USED FOR LIGHT METERING

(71) Applicant: Albert Theuwissen, Bree (BE)

(72) Inventor: Albert Theuwissen, Bree (BE)

(73) Assignee: Harvest Imaging bvba (BE)

( * ) Notice: Subject to any disclaimer, the term of this patent is extended or adjusted under 35 U.S.C. 154(b) by 172 days.

(21) Appl. No.: 13/849,618

(22) Filed: Mar. 25, 2013

(65) Prior Publication Data

US 2014/0285685 A1    Sep. 25, 2014

(30) Foreign Application Priority Data

Mar. 22, 2013   (EP) ..................................... 13160709

(51) Int. Cl.
*H04N 5/238* (2006.01)
*H04N 5/235* (2006.01)
*H04N 5/369* (2011.01)
*H04N 5/232* (2006.01)
*G03B 13/00* (2006.01)

(52) U.S. Cl.
CPC ......... *H04N 5/2353* (2013.01); *H04N 5/23212* (2013.01); *H04N 5/3696* (2013.01)

(58) Field of Classification Search
CPC ............ H04N 5/2356; H04N 5/23212; H04N 5/3696; H04N 5/2351; G03B 13/20
USPC .................................. 348/345–357, 362, 364
See application file for complete search history.

(56) References Cited

U.S. PATENT DOCUMENTS

| | | | |
|---|---|---|---|
| 2007/0154200 A1* | 7/2007 | Utagawa et al. | 396/111 |
| 2009/0278966 A1 | 11/2009 | Kusaka | |
| 2012/0327267 A1* | 12/2012 | Takahara | 348/231.99 |
| 2013/0002911 A1* | 1/2013 | Miyashita et al. | 348/247 |
| 2013/0308040 A1* | 11/2013 | Ishii | 348/353 |
| 2014/0240585 A1* | 8/2014 | Takahara | 348/345 |

OTHER PUBLICATIONS

European Search Report for European Application No. 13160709.5 dated Nov. 12, 2013.

* cited by examiner

*Primary Examiner* — Kelly L Jerabek
(74) *Attorney, Agent, or Firm* — Barnes & Thornburg LLP (57) ABSTRACT

A digital camera (400) comprises a sensor array (410) having image pixels (I) for capturing image data during an exposure period (EP), and focus-detection pixels (F) for determining focus information in a first mode of operation. The digital camera (400) is adapted for obtaining brightness related data (v) from the focus-detection pixels (F) in a second mode of operation, during capturing of an image by means of the image pixels (I), the digital camera further comprising a controller (428) adapted for determining the exposure period (EP) based on the brightness related data (v) obtained from the focus-detection pixels (F). A corresponding method is also provided.

11 Claims, 6 Drawing Sheets

DIGITAL CAMERA WITH FOCUS-DETECTION PIXELS USED FOR LIGHT METERING

FIELD OF THE INVENTION

The present invention relates to the field of digital cameras, and more particularly to techniques for light metering, for example on-the-fly light metering, in such cameras during capturing of images. Such on-the-fly light metering may be used for automatically determining exposure time in digital cameras.

BACKGROUND OF THE INVENTION

Digital cameras are known in the art as devices capable of taking still pictures or video by capturing images on an electronic image sensor, and digitally storing the captured image or video on a digital memory, usually after digital compression and embedding in known file formats, such as e.g. JPEG for still pictures, and e.g. AVI or MOV for movies. A digital camera can be a stand-alone dedicated device, or may be embedded in another device, such as e.g. a mobile phone, a laptop computer, etc.

Digital cameras have evolved substantially over the years, not only in image resolution and storage capacity, but also in features for facilitating the capturing of high quality pictures under highly varying circumstances, e.g. light/dark scenes, far/near objects, still/moving objects, etc.

An important aspect is that of light/dark scenes, which is related to the amount of incoming light. The term "over-exposure" is used to indicate that too much light enters the image sensor, such that some or most or all of the sensor elements are saturated. The term "under-exposure" is used when the amount of incoming light is insufficient for having a good contrast ratio or dynamic range. In order to avoid over-exposed ("too bright") or under-exposed ("too dark") images, several settings, such as e.g. "aperture" (or opening) and shutter time (or exposure time), need to be correctly set, for determining the amount of incoming light. "Aperture" is the diameter of an opening with an adjustable diameter centred on the optical axis in order to adjust the light quantity and the extent of blur.

While in early cameras one or more of these settings needed to be set manually, many modern cameras are provided with automatic light metering, and/or auto-focus, and/or automatic determination of the exposure time.

U.S. Pat. No. 8,009,223 describes a digital camera having an image sensor with both "image pixels" and "non-image pixels" (also referred to as "focus-detection pixels"). The non-image pixels are different from the surrounding image pixels, and are designed for providing information for automatically focusing the lens. The focus-detection pixels do not contribute to the normal shooting of an image, i.e. they do not provide actual image data. An algorithm is described for determining a defocus amount, and for adjusting the focus point of the lens accordingly. An algorithm is also provided for determining pixel data at the location of the focus detection pixels, through interpolation of imaging pixels present near the focus detection pixels. However, this document does not describe how the light metering is done, nor how the exposure time is determined.

US20120013762 describes a solid state camera adapted for automatically determining a final exposure setting (including e.g. gain, integration time and aperture), by assuming initial exposure settings, and then repeatedly capturing a full image using the previously determined exposure settings, and adjusting the exposure setting based on histogram information of the full image data thus taken, until optimal exposure settings are found, and then taking the final image using the final exposure settings. Besides of being complicated, this method suffers from a long latency (time between pressing "the button" and the time when the image is actually captured).

SUMMARY OF THE INVENTION

It is an object of embodiments of the present invention to provide a good method and device for capturing image data.

In particular, it is an object of embodiments of the present invention to provide a method and a device for capturing image data without dedicated light metering sensors being required.

This objective is accomplished by a device and a method according to embodiments of the present invention.

In a first aspect, the present invention provides a digital camera comprising a sensor array having image pixels for capturing image data during an exposure period, and focus-detection pixels for determining focus information in a first mode of operation. In accordance with embodiments of the present invention, the digital camera is adapted for obtaining brightness related data from the focus-detection pixels in a second mode of operation, during capturing of an image by means of the image pixels. The digital camera further comprises a controller adapted for determining the exposure period based on the brightness related data obtained from the focus-detection pixels.

In this camera, the focus pixels, which may be used for focusing the lens, may also be used for light metering. In this way, the focus pixels are more efficiently used, and the need for a dedicated light sensor can be omitted. By obtaining brightness related information from the focus pixels during capturing of the image, on-the-fly, light metering can be done much faster than extracting light information from already captured images, because simply reading out the information on the focus pixels can be much faster than reading out an entire image or image pixels, since the amount of focus pixels is only a fraction (e.g. less than 5%; less than 3%, less than 2%, less than 1%) of the total amount of pixels of an image sensor.

Such on-the-fly light metering during capturing of images provides more accurate light metering, especially in fastly varying circumstances, such as for example video capturing, or in case where extremely long exposure times are needed, e.g. due to extremely low light levels.

In the digital camera according to embodiments of the present invention, the controller may have a processor for performing statistical processing on the brightness related data from the focus-detection pixels. The controller may be adapted for calculating the sum (S) or the average (A) of the brightness related data (v), and for calculating the exposure period (EP) according to a suitable function, such as for instance the function: $EP=a/(S-b)$, or according to the function: $EP=a/(A-b)$, wherein EP is the exposure period, S is the sum of the brightness related data, A is the average of the brightness related data, and a, b are constants.

In a second aspect, the present invention provides the use of focus-detection pixels for light-metering in a digital camera, on-the-fly, during capturing of an image by means of image pixels.

This offers the advantage that a dedicated light sensor is not required, which is more cost effective. This also offers the advantage that the entire image needs not be processed (e.g. using histogram information), thus saving power and time.

The latter may be especially important when capturing e.g. fast moving objects, or sports events or the like, where it is important that the camera captures an image as fast as possible after pushing the shutter button, without first going through multiple iterations for selecting the optimal exposure settings, as is done in some prior art solutions.

In a third aspect, the present invention provides a method of capturing a digital image by a digital camera, the digital camera comprising a sensor array having image pixels and focus-detection pixels. The method comprises:
a) obtaining brightness related information from the focus-detection pixels while capturing image data from the image pixels;
b) determining an exposure period for capturing image data, based on the obtained brightness related information; and
c) halting capturing image data from the image pixels (I) when the determined exposure period (EP) has elapsed.

In this method, the focus pixels are used for light metering. In this way, the focus pixels are more efficiently used, as they are not only used for focussing. Moreover, a dedicated light sensor can be omitted. By obtaining brightness related information from the focus pixels, light metering can be done much faster than extracting light information from captured images, typically from a plurality of captured images, because the focus pixels can be read out much faster than entire images, since the amount of focus pixels is only a fraction (e.g. less than 5%, less than 3%, less than 2%, less than 1%) of the total amount of pixels of an image sensor.

The method according to embodiments of the present invention, where the digital camera comprises a focus lens, may furthermore comprise, before obtaining the brightness related information, focusing the lens based on focus related information obtained from the focus-detection pixels.

In this method, the focus pixels are first used for focusing the lens, and are thereafter used for light metering.

In a method according to embodiments of the present invention, step b) may comprise:
d) integrating charge on the focus-detection pixels during a predetermined period;
e) reading brightness related data from the focus-detection pixels;
f) performing statistical processing, e.g. calculating the sum or the average, of the brightness related data, and
g) determining the exposure period as a predefined function of the statistical processing results, e.g. of the calculated sum or the calculated average.

Calculating the sum or average value of a number of pixel values is very easy, and requires only a low end processor. When the number of focus pixels is a power of two, then the division can be implemented by a shift-operation. The exposure period can then be determined by calculation, e.g. using a mathematical formula such as: $EP=a/(S-b)$, or $EP=a/(A-b)$, whereby EP is the exposure period, S is the sum, A is the average, and a, b are pre-defined constants, which can easily be determined by calibration. Alternatively, the exposure period EP can be determined by means of a look-up table, translating the sum or average into the exposure period.

It is to be noted that exposure in general can be controlled by exposure time, aperture setting of the lens and electronic gain setting (in the analog and/or the digital domain). So basically the output of the focus pixels during the light metering phase in accordance with embodiments of the present invention can be used to change any of these parameters or even a combination of these parameters.

In a method according to embodiments of the present invention, the image data capturing in step a) may be performed while determining the exposure period in step b).

In this embodiment, the capturing of image data from the image pixels is happening substantially at the same time as the "light metering" is being done. It is an advantage of this embodiment that the capturing of the image can start even before the exposure period is known, since the duration of the exposure period is determined "on-the-fly".

It is an advantage that the image can be captured faster (as compared to implementations where the exposure period EP is pre-calculated), since the step of "light metering" is done simultaneous with the image capturing. Other advantages are that the focus pixels are more efficiently used, that is, they are not only active during focusing, but also during the actual image capturing; that the focus pixels (acting as light metering pixels) can be distributed across the active sensor area, as opposed to being concentrated only in the centre (as is usually done with "spot-metering"). This may be more representative for the brightness of the entire image area. Furthermore, it is advantageous that the light metering is done on the focused areas, which may give more accurate results. For long exposure times, (i.e. dark scenes), a very accurate light monitoring is possible. The latency between the moment of pushing the shutter button and the actual image capture is reduced, thus the risk of "missing" time critical images is reduced. Furthermore, this method takes maximum account of changing light conditions during the image capture, because the "light metering" is done while the image data is being captured.

In a method according to embodiments of the present invention, where light metering is being performed during image capturing, step b) may comprise:
h) integrating charge on the focus-detection pixels during a predetermined period;
i) reading brightness related data from the focus-detection pixels;
j) determining a result by performing a statistical analysis on the brightness related data, and
k) repeating steps h) to k) until the result satisfies a predefined criterion.

Since a plurality of brightness-related values are obtained (one from each focus pixel or focus pixel pair), statistical analysis can be performed on this data, and by choosing an appropriate criterion, good conditions can be determined for ending the integration of the image capturing. The statistical analysis may include e.g. determining a histogram, or determining an average value and a variance (assuming e.g. a Gaussian distribution), or may comprise calculating simply the average value and/or the minimum and/or the maximum value.

In such method, step j) may comprise calculating statistical information such as e.g. the sum or the average of the brightness related data, and the criterion may be the result of the test if the statistical information, e.g. the sum or the average, is larger than a predefined threshold level.

This is a very simple algorithm, thus very fast, and requiring only few resources (processing power and energy). This offers the advantage that the time required for the light metering (per iteration) is very short, so that the light can be measured at a high resolution during the image capture (not just a very limited number of times, but e.g. more than twenty times, preferably more than forty times, or even more than sixty times). It this way, the integration can be stopped very accurately.

In a further aspect, the present invention provides a method of capturing a movie by a digital camera, the movie comprising a plurality of consecutive images, the digital camera comprising a sensor array having image pixels and focus-detection pixels. The method comprises:

a) capturing image data from the image pixels and simultaneously determining the exposure period based on brightness related information obtained from the focus-detection pixels;
b) repeating step a) until the plurality of images are captured.

It is an advantage of such a method that the exposure period is automatically controlled, and that the amount of incident light is automatically determined for each frame. In this way the risk of over-exposure and/or under-exposure can be avoided or limited. Especially with moving pictures, the amount of light incident on the sensor may considerably change from one picture to the other, which is taken care of automatically.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

When reference is made to "image pixels", reference is made to light-sensitive sensor elements of an image sensor array provided for capturing image data. The image pixels are typically overlaid with a colour filter. For example, if a so called "Bayer filter" is used as a colour filter, three types of image pixels are created: R-pixels for capturing a red light component, G-pixels for capturing a green light component, and B-pixels for capturing a blue light component. In embodiments of the present invention, other colour filters may also be used. In the context of the present invention, image pixels are indicated with reference "I", when it is not important to make a distinction between R, G or B (or any other colour) pixels.

When reference is made to "focus-detection pixels" or "focus-pixels", reference is made to light-sensitive elements of an image sensor array especially adapted and arranged for detecting defocus-information. These pixels are usually not overlaid with the same colour filter as the surrounding image pixels. Part of these pixels may deliberately be shielded by a metal screen.

In the present document, the terms "integration time", "integration period", "exposure time" and "exposure period" are used as synonyms, and are used for indicating the time during which electrical charge is accumulated on the image pixels.

Figure 1:
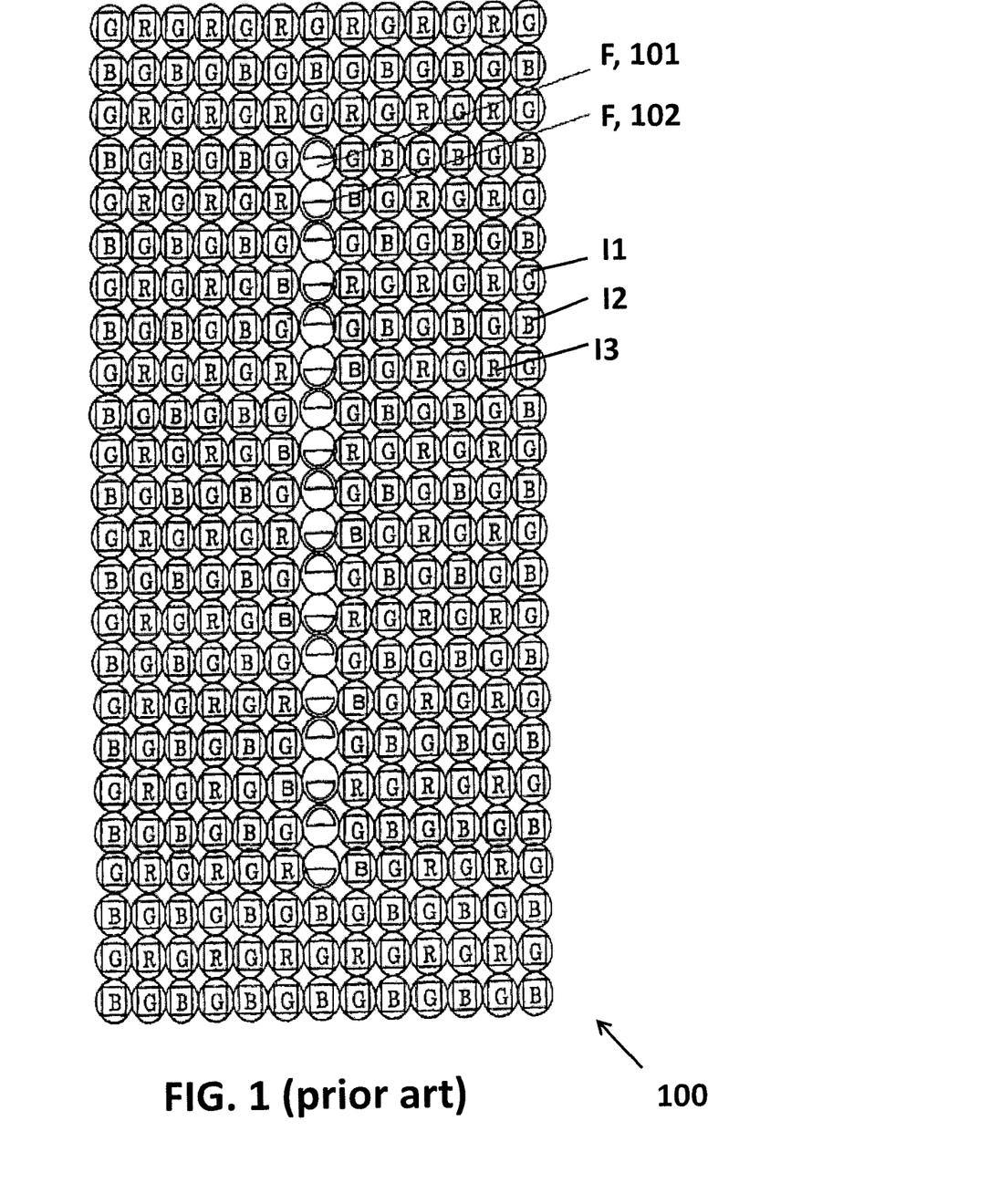
FIG. 1 shows an example of a prior art image sensor comprising image pixels and focus-detection pixels.

FIG. 1 is a copy of FIG. 3 of U.S. Pat. No. 8,009,223 and shows an example of a two-dimensional image sensor array 100 (or a part thereof) comprising image pixels (indicated by "R", "G" and "B"), herein further indicated with reference "I", and focus-detection pixels 101, 102, herein further indicated with reference "F". It is irrelevant for the present invention whether the image pixels I, close to or far away from the focus pixels F, do or do not follow the standard Bayer pattern, or any other colour pattern. Of course, the estimation of image data for the locations of the focus-pixels, which is usually done by interpolation of neighbouring image pixels, will be dependent on the particular arrangement chosen. As described in detail in the cited patent, focus-pixels F are typically arranged on a partial row or partial column of the image sensor array, and typically occur in pairs having a specific phase relation for allowing focus-detection. The exact implementation of the focus pixels (e.g. one focus pixel occupying one pixel location (as shown e.g. in FIG. 5A or FIG. 5B of the cited patent), or a focus pixel pair occupying a single pixel location (as shown e.g. in FIG. 18 of the cited patent)) is also irrelevant for the present invention, and other focus pixel architectures or arrangements than the ones illustrated in the cited patent may also be used. The cited patent discloses image-interpolation methods for estimating image data for the pixels occupied by the focus pixels, and focus-detection methods. Such methods, or similar methods, may be used in embodiments of the present invention, and in view of their description in the cited patent need not be described further here. The reader may consult the cited patent or other literature for further details, if desired.

Figure 2A:
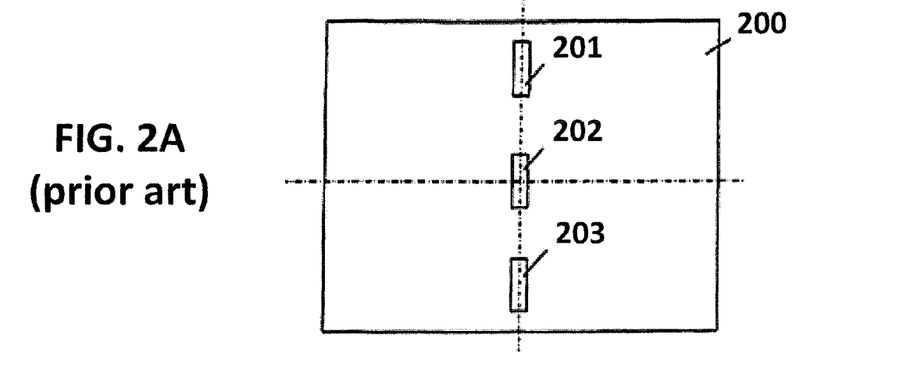
FIG. 2A, FIG. 2B and FIG. 2C illustrate several examples of possible arrangements of focus-detection pixels, known in the art.
Figure 2B:
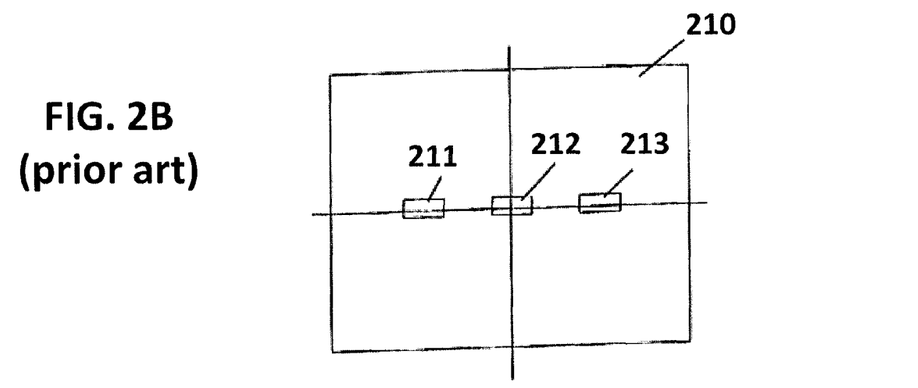
Figure 2C:
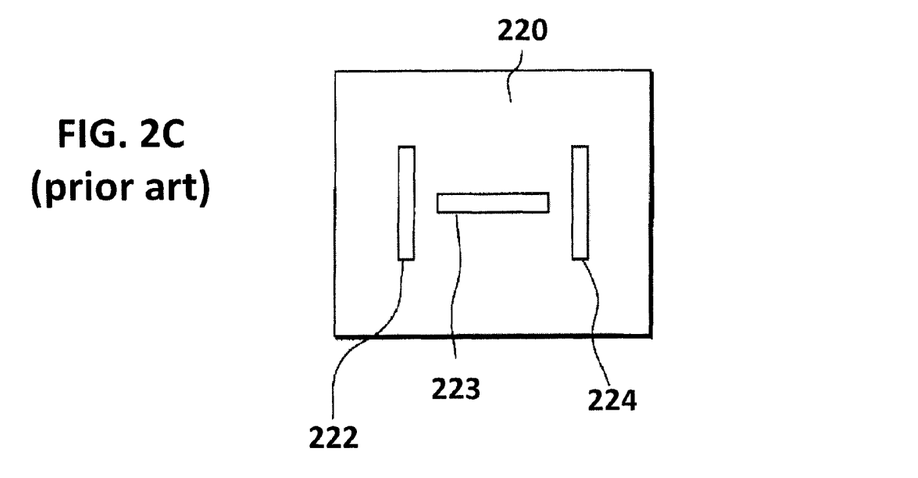

FIG. 2A, FIG. 2B and FIG. 2C show several examples of possible arrangements of focus-detection pixels, known in the art. FIG. 2A, as also illustrated in U.S. Pat. No. 8,009,223, shows an example of three focus-detection pixel column areas, i.e. focus-detection areas 201, 202 and 203 set at the centre and on the upper side and the lower side of a rectangular photographic image sensor array 200. A plurality of focus-detection pixels F are arranged in a straight line along the longer side of each rectangular focus detection area. In the example illustrated, the three focus-detection pixel column areas are located on a single column; the present invention, however, not being limited thereto. Different focus-detection pixel column areas could be located at different columns. FIG. 2B shows a sensor array 210 having three focus-detection pixel areas 211, 212 and 213 arranged horizontally. In the example illustrated, the three focus-detection pixel areas are located on a single row; the present invention, however, not being limited thereto. Different focus-detection pixel areas could be located at different rows. FIG. 2C, extracted from U.S. Pat. No. 6,781,632, shows yet another example of an image sensor 220, where focus-detection pixel areas 222, 223, 224 are arranged both horizontally and vertically. These are but three examples of possible arrangements of focus pixels F in an image sensor array, but the present invention is not limited thereto, and other, more complex, or simpler arrangements may also be used. Preferably, however, there is always a focus pixel area in or near the centre of the image sensor.

Figure 3:
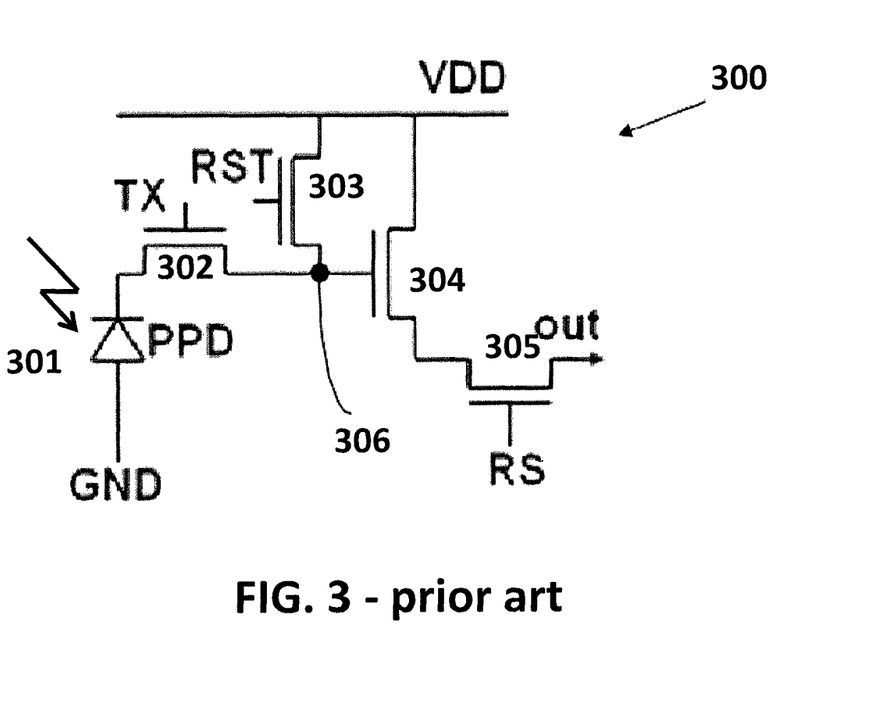
FIG. 3 shows a circuit diagram of a so-called "4T" image pixel architecture, known in the art.

FIG. 3 illustrates, as an example only, a so called "4T" (four-transistor) pixel configuration 300 for a CMOS image sensor, as is known in the art, and as can be used in the image sensor array 410 of the present invention. All transistors in the pixel 300 are MOS transistors. The pixel 300 illustrated in FIG. 3 comprises a photoreceptor 301, in the example illustrated a pinned photodiode PPD, for converting impinging radiation into electric charge. The pixel 300 furthermore includes a sample and hold transistor 302 for transferring charge generated by the photoreceptor 301 towards a sense node 306 (also known as "floating diffusion"), a reset transistor 303 for resetting the sense node 306 to a starting value (e.g. the supply voltage VDD), a source follower transistor (also called "amplifier") 304 for copying the voltage of the floating diffusion (having a small capacitance) to the output pin or column bus (having a large capacitance), and a select transistor 305 for actually putting that voltage onto a readout-line, e.g. on a column line. This circuit can be used for both image pixels I and focus-pixels F. Important for the present invention is that the charge, indicative for the brightness of the incoming light, stored on the floating diffusion 306 of focus pixels, can be read-out multiple times, in a non-destructive way, in the example illustrated for example by activating select transistor 305, while the charge (integrated so far) remains on the floating diffusion 306. The accumulated charge is only "erased" when the reset transistor 303 is activated. However, the invention is not limited to pixels (or sensor cells) with the 4T-pixel architectures, and other pixel architectures whereby the pixels can be read out multiple times in a non-destructive manner, can also be used. As will be explained further, in embodiments of the present invention, only the focus pixels F need to be read out multiple times, not the (normal) image pixels I.

The "integration time" or "exposure time" is defined as the amount of time that a pixel is allowed to detect incident light. In the case of the 4T-transistor architecture shown in FIG. 3, the integration time is the interval between the moment at which the photodiode PPD, 301 is isolated (e.g. TX=low, hence the sample and hold transistor 302 not transferring any charges towards the sense node 306), such that the pinned photodiode (at its upper node in FIG. 3) is allowed to collect and store charges in response to the incident light (indicated by the arrow), and the time at which the collected and stored charges are transferred to the sense node 306 for actual readout by external circuitry.

It is to be noted that exposure in general can be controlled by exposure time, aperture setting of the lens and electronic gain setting (in the analog and/or the digital domain). So basically the output of the focus pixels during the light metering phase in accordance with embodiments of the present invention can be used to change any of these parameters or even a combination of these parameters.

Another aspect that may be important for the present invention is that the focus pixels F can be read out relatively fast, e.g. at least four times faster than reading an entire image, preferably at least ten times faster, or even twenty times, or fifty times faster. This can be accomplished by choosing an appropriate readout architecture. For example, in an image sensor with column-readout circuitry, an entire row of pixels can be read out, and digitized in a single step. In the example illustrated in FIG. 2B, all brightness related data from the focus-detection pixels can be read out at once, by reading only the row where the focus pixels are located. When the focus pixels are organized vertically (as in FIG. 2A or FIG. 2C), other techniques may be used for fast readout, for example, the focus pixels F may be readout via dedicated readout-circuitry, or they may be remapped (routed) to the A/D-convertors, via switches, for fast readout, as for example described in co-pending EP11195783.3 of the same inventor. The details of how the focus-detection pixels are read are not important for the present invention, it is only important that the focus pixels F can be readout multiple times during the exposure period "EP" of the image pixels I.

According to an aspect of the present invention, a digital camera 400 is provided, wherein focus-pixels F are not only used for focusing, but also for "light metering", thus for determining light-related information of the scene to be captured, and this substantially simultaneous with the actual image capture. As far as is known to the inventor, the focus pixels F of the prior art image sensors were never used for this purpose. The use of focus pixels for light metering offers the advantage that a dedicated light sensor is not required, which is more cost effective. This also offers the advantage that the entire image need not be processed (e.g. using histogram information), thus power and time are saved. The latter may be especially important when capturing for instance fast moving objects or sports events or the like, where it is important that the camera captures an image as fast as possible after pushing the shutter button, without first going through multiple iterations for selecting the optimal exposure settings, as is done in some prior art solutions. Moreover, determining light-related information of the scene to be captured while actually capturing the image further decreases the total time required for capturing an image, which may be especially important when capturing e.g. fast moving objects, or sports events. Also at very low light levels, typically long integration times are required, which makes a light measurement before actually imaging the scene very impractical. Furthermore, the exposure time may be correctly set right from the first image taken.

In this embodiment, the digital camera 400 (see FIG. 4 for an example of a possible embodiment) would first use the focus pixels F, used in a first mode of operation, for focussing a lens 440, i.e. for changing the focal length of a lens 440, part of an optics component 404 such as an object-glass, by using known methods, so that a sharp image can be captured by the image sensor. Then, when the lens 440 is in focus, the data provided by the focus pixels F, used in a second mode of operation in accordance with embodiments of the present invention, is used for "light metering". Hereto, when the lens 440 is in focus, the charge stored on both the image pixels I and on the focus pixels F is reset, and at time t0 integration of charge is started substantially simultaneously on both the image pixels I and focus pixels F, as illustrated in FIG. 5A and FIG. 5B for an image pixel I and a focus pixel F, respectively. Then, at at least one time interval $\Delta ti$, i=1 to n, e.g. at a plurality of time intervals $\Delta ti$, after t0, e.g. at times ti, i=1 to n, the data stored on the focus pixels F, indicative for the brightness of the scene, is digitized and read-out in a non-destructive way, yielding a plurality of values vi[j], (vi being the values read at ti, for j=1 to m being the focus pixel number, m being the number of focus pixels F), (e.g. one value v1 for each focus pixel F, or one value v1 for each pair of focus pixels), the value vi[j] being representative for the amount of light present on the particular focus pixel F[j] at time ti.

After the first time interval $\Delta t1$, some statistical processing is applied on the captured data v1[j] (j=1 to m) of the focus pixels, e.g. the average A1 is calculated (for example as the sum of the values v1[j] divided by the number m of focus pixels), and that average value A1 is compared to a predefined threshold level T. It can be tested whether the average value A1 is larger than the threshold level T, and if so, the exposure period EP is over; otherwise, the exposure continues (for both focus pixels and image pixels).

If the value A1 is not larger than the threshold level T, after readout of the focus pixels F at time t1, the floating diffusions of these focus pixels F are not reset, and the transferred charge simply remains on the floating diffusion. In this way, the accumulated charge after $\Delta t1$, and later after $\Sigma \Delta ti$, is stored on the floating diffusion of the focus pixels. Sometime later, e.g. at time t2 which is a time $\Delta t2$ after t1, the focus pixels F are read out again, yielding a plurality of values v2[j] (j=1 to m). The statistical processing is now applied to the captured data values v2[j], j=1 to m, e.g. the average A2 is determined, and compared to the threshold T1. Since A2 is still smaller than T1 in the example of FIG. 5B, the exposure continues, etc. In the embodiment illustrated, the same will occur at times t3, t4 and t5. It is noted that the image pixels are not read out at t1, t2, t5, . . . , thus saving a lot of time and power. In the embodiment illustrated, at time t6, the focus pixels are read-out again, yielding the values v6[j], and the average value A6 is calculated. However, this time it is found to be larger than the predefined threshold level T, indicating that the sensor received enough light and the overall integration can be stopped. This determines the end of the exposure period EP, and the image pixels I are read-out.

In embodiments of the present invention, as explained above, the floating diffusion is used as a temporary storage of charges. It is known that the floating diffusion has a much larger leakage current than the photodiode. Hence, the longer the exposure period EP, the more leakage current is collected on the floating diffusion, and the more the measurement deviates from reality. Therefore, in accordance with embodiments of the present invention, dark current correction can optionally be performed at every measurement at ti.

The threshold level T may be determined by routine experiments. Alternatively, the threshold level T may be defined at the moment of manufacturing the camera. Yet alternatively, the threshold level T can be determined using pre-stored reference images or reference data. It should be mentioned that focus pixels F may have a different light sensitivity, and a different dark current behaviour than those of the image pixels 1. But these may be easily corrected (or compensated for) by using a different gain and/or offset for the focus pixels. The skilled person can find suitable values by performing some calibration tests.

Typically, the readout of the focus pixels F used in the first mode and in the second mode may be equal, although they could be different. Signals can be digitized before being used as a control signal for focus or, in accordance with embodiments of the present invention, for light metering. Alternatively, both focus adjustment and light metering, or either one of both, can be performed in the analog domain. In particular embodiments, the first mode and second mode can be combined, and focus information obtained from the focus pixels F can be used for light metering.

As an example only, the light metering could be performed e.g. by measuring the charge stored on the focus pixels F after being exposed during one or more predefined periods, the charge being indicative for the amount of light emanating from the scene to be imaged and impinging on the image sensor array. From this amount of charge, the exposure time EP for an image to be captured simultaneously can be determined.

The captured image data may then be further processed in a way known to a person skilled in the art, e.g. by correcting dot errors, and/or by interpolating image pixel values for determining image data for the focus-pixel locations, and/or by image compression, etc.

The main advantage of this method (and digital camera) over that disclosed in US20120013762 is that the image can be captured much faster since no multiple images are to be taken using different exposure settings, and in that it is much less power consuming, since the amount of data to be processed is much smaller (the amount of focus pixels F is typically less than 5%, even less than 3%, less than 2%, less than 1% of the number of image pixels in the image sensor array).

A further advantage is that the image can be captured even faster (as compared to implementations where the exposure period EP is pre-calculated), since the step of "light metering" is done simultaneously with the image capturing.

Other advantages are:
More efficient use of the focus pixels, which are otherwise inactive during the actual image capturing,
The focus pixels as light metering pixels can be distributed across the active sensor area, as opposed to being concentrated only in the centre (as is typically done with classical "spot-metering"),
The light metering is done on the focused areas, which may give more accurate results,
For long exposure times, (i.e. dark scenes), a very accurate light monitoring is possible (because it is done simultaneously with the image capturing),
The latency between the moment of pushing the shutter button and the actual image capture is reduced,
and, last but not least, this method takes maximum account of changing light conditions during the image capture, because the "light metering" is done while the image data is being captured.

It is to be noted that the readout of the focus pixels F in FIG. 5B is shown to be periodic, but that is not absolutely required, and the time period Δti between two moments of sampling the focus pixels F may vary; in other words, (t2−t1) need not be identical to (t1−t0), etc.

It is contemplated that the "light metering" method simultaneously with the "image capture" may also be used in case of video capturing. It is an advantage of such a method that the exposure period is automatically controlled, and that the amount of incident light is automatically determined for each frame. In this way the risk of over-exposure and/or under-exposure can be limited or even avoided. Especially with moving pictures, the amount of light incident on the sensor may considerably change from one picture to the other, which is taken care of automatically in accordance with embodiments of the present invention.

In an alternative embodiment of a video camera according to aspects of the present invention, the focus pixels F are used (e.g. during even frame numbers) for "auto-focusing", in which case the exposure period EP determined during the previous frame is taken as a pre-defined value for the next frame, and wherein the focus pixels F are used for "light-metering" (e.g. during odd frame numbers), while the lens 404 is maintained in the position determined by the previous frame. Of course "odd" and "even" may be interchanged, and the auto-focusing may occur not every two frames, but once per every M frames, whereby M for example is a number in the range of 2 to 30.

Figure 4:
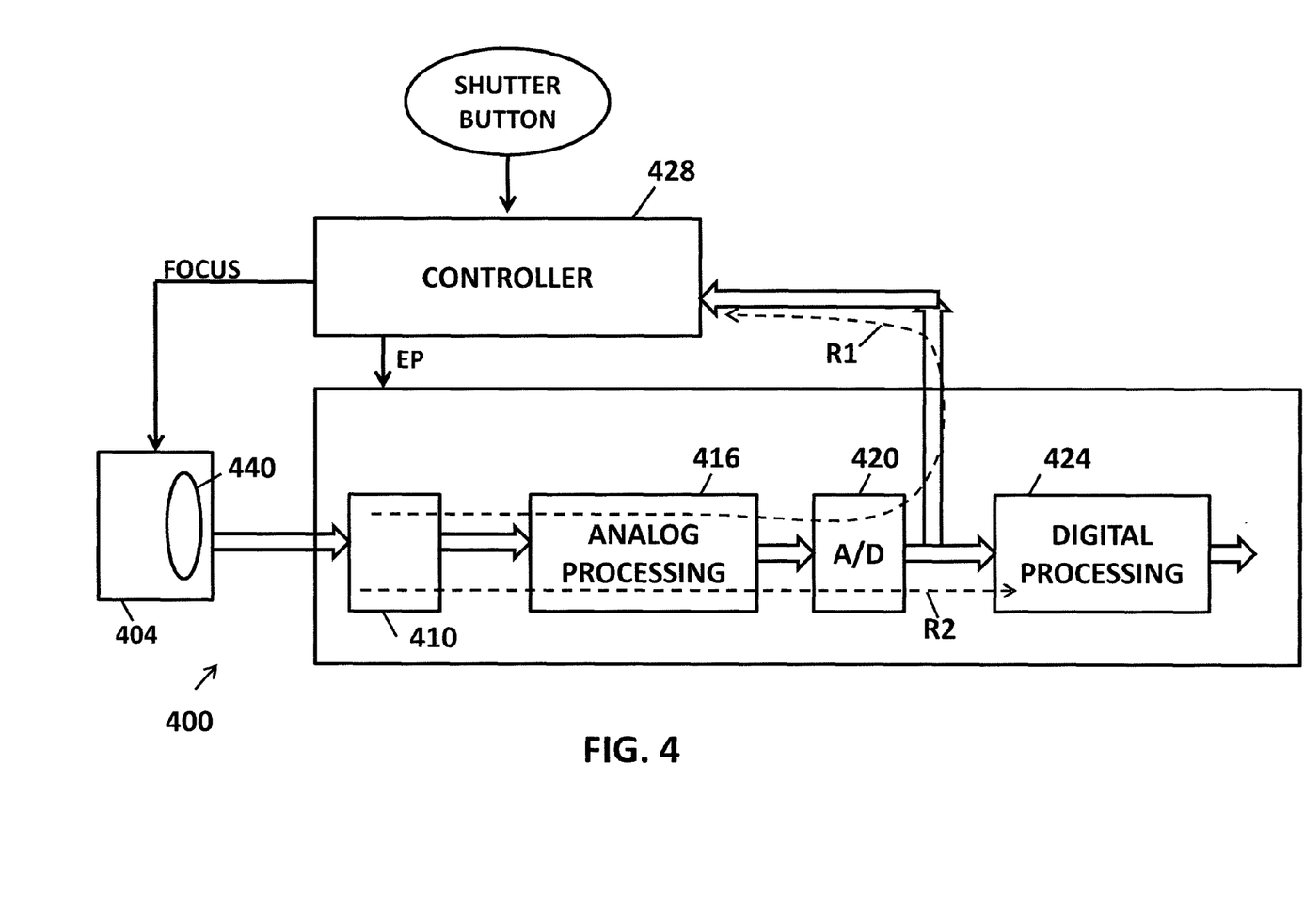
FIG. 4 shows an example of a block-diagram of a digital camera according to embodiments of the present invention.
Figure 5A:
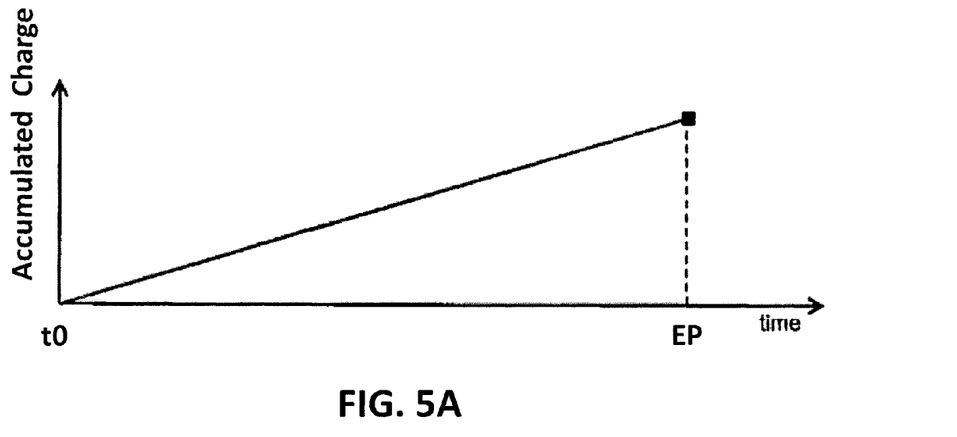
FIG. 5A and FIG. 5B show an example of how the integration time (exposure period) is automatically determined according to aspects of the present invention, by monitoring brightness related data obtained from the focus-detection pixels.
Figure 5B:
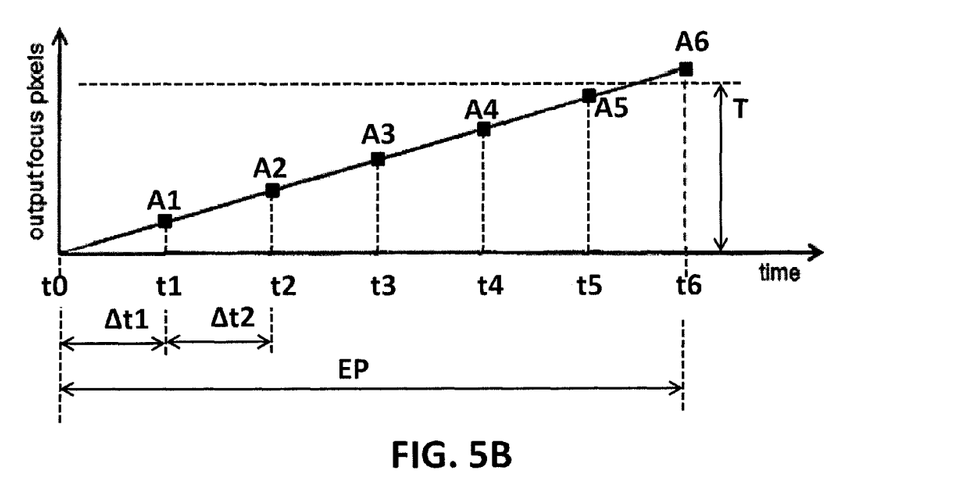

FIG. 4 shows an example of a possible block-diagram of a digital camera 400 according to embodiments of the present invention. It is to be noted that the embodiment described above can be implemented in such digital camera 400.

The digital camera 400 includes optics 404 that has a conventional aperture (not shown), filter (not shown), and lens system 440 used to guide the incident light into the camera and onto an image sensor array 410. The image sensor array 410 comprises image pixels I and focus-detection pixels F, as described above. The focus-detection pixels F are adapted for providing defocus information when used in a first mode, and are adapted for providing "light metering" information when used in a second mode. Both types of pixel values may be subjected to analog processing in an analog processing block 416 before being forwarded to an array of analog-to-digital (A/D) converters 420 for digitizing the analog pixel values. The digitized values obtained from the focus pixels F, and indicative for the brightness of the scene, are routed in the second mode of operation, to a control block 428 for automatic determination of the exposure period EP. The image pixel values are routed to a digital processing block 424 and may be subjected to digital processing (e.g. cross-talk-correction, and image data estimation for the locations of the focus pixels, etc) before being provided as digitized image data or digitized video data, which may be stored e.g. after file formatting, on a digital memory (not shown). The controller 428, the image sensor array 410, the analog processing block 416, the A/D block 420 and the digital processing block 424 may be integrated in a single integrated circuit implemented in CMOS technology.

Route R1 indicates the path followed by the brightness-related data (charge, analog value, digital value) obtained from the focus pixels F into the controller 428. Route R2 indicates the path followed by the image related data (charge, analog value, digital value) obtained from the image pixels I into the digital processing block 424.

The analog processing block 416 may include known circuitry, such as e.g. correlated double sampling circuitry, as well as any gain and filtering, or offset correction.

The A/D converters in block 420 may for example be 8-bit or 10-bit or 12-bit or 14-bit convertors.

The control block 428 may be implemented in hardware, or in a programmable controller, such as e.g. a DSP (digital signal processor), provided with an algorithm for reading a plurality of focus pixel values F, for performing the statistical processing, e.g. calculating the average Ai thereof, for comparing the average value Ai with a predefined threshold level T, and for providing one or more signals for indicating the start and/or stop of the "exposure period" EP.

The digital processing block 424 may also be implemented in hardware, or in a programmable DSP, which may be the same or another DSP than the control block 428.

Figure 6:
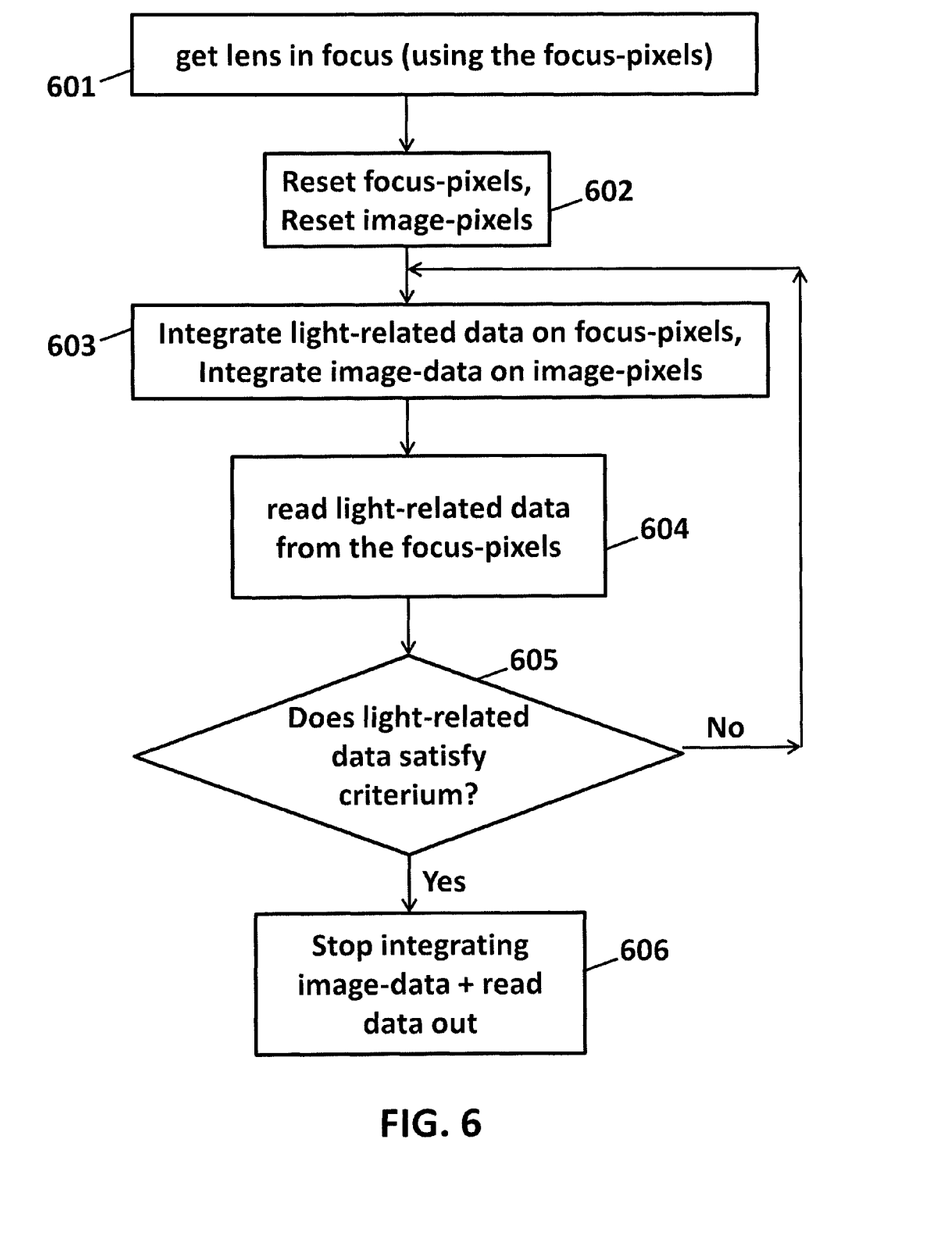
FIG. 6 shows a flow-chart of a method according to embodiments of the present invention.

FIG. 6 shows a flow-chart of a method according to an embodiment of the present invention. In a first step 601, the digital camera uses the focus pixels for getting the lens 404 into focus, as is known in the art. In a next step 602, the focus pixels F and the image pixels I are reset (e.g. by activating the RST and TX lines of the pixels shown in FIG. 3). In the next step 603, "light-metering" is done by integrating charge in the focus pixels F, and meanwhile image data is captured by integrating charge in the image pixels I. Sometime later (e.g. at time t1, in FIG. 5B), step 604 is executed, wherein the values v1[j] (j=1 to m, m being the number of focus pixels) obtained from the focus pixels F are read-out in a non-destructive way and used as "light-metering" data, the value v1[j] of the focus pixel F[j] being proportional to the light incident in the focus pixel F[j], and used as an indicator for the light incident on the image sensor 410. When a suitable read-out-architecture is used, the readout of the focus pixels F can be extremely fast (e.g. equivalent to the readout of one, one and three rows of pixels, respectively, for the examples of FIG. 2A, FIG. 2B and FIG. 2C, respectively), as described above, e.g. using "re-mapping" techniques. In the next step 605 the controller 428 performs some statistical analysis on the values v[j], e.g. digitized values, of the focus pixels F (e.g. calculating the average value Ai), and performs a test if the data satisfies a predefined criterion (e.g. checks if the average value Ai is larger than a predefined threshold T). If the outcome of the test is "FALSE" (indicated by NO after 605), which is the case for t1, t2, . . . , t5 of the example of FIG. 5B, then the exposure continues, or in other words, the integration of the light in the focus pixels F and in the image pixels I continues. If the outcome of the test is "TRUE" (indicated by YES after 605), which is the case at t6 of FIG. 5B, this means that a sufficient amount of light is captured by the focus pixels used for having a good exposure, and the integration is stopped. The image data is then read-out in step 606.

The invention claimed is:

1. A digital camera, comprising a sensor array having image pixels for capturing image data during an exposure period, and focus-detection pixels for determining focus information in a first mode of operation;
    wherein the digital camera is adapted for obtaining brightness related data from the focus-detection pixels in a second mode of operation during capturing of an image by means of the image pixels, the digital camera further comprising a controller adapted for determining the exposure period based on the brightness related data obtained from the focus-detection pixels while capturing said image from the image pixels.

2. The digital camera according to claim 1, wherein the controller has a processor for performing statistical processing on the brightness related data from the focus-detection pixels.

3. The digital camera according to claim 1, wherein the controller is adapted for calculating a sum (S) or an average (A) of the brightness related data from the focus detection pixels, and for calculating the exposure period (EP) according to the function: EP=a/(S−b), or according to the function: EP=a/(A−b), wherein EP is the exposure period, S is the sum of the brightness related data, A is the average of the brightness related data, and a, b are constants that are determined by calibration.

4. The digital camera according to claim 1, wherein the controller is adapted for calculating a sum or an average of the brightness related data, and wherein the exposure period is determined by means of a look-up table, translating the sum or the average into the exposure period.

5. The digital camera according to claim 1, comprising a readout architecture such that the focus pixels can be read out at least four times faster than the entire image.

6. A method of capturing a digital image by a digital camera, the digital camera comprising a sensor array having image pixels and focus-detection pixels, the method comprising:

a) obtaining brightness related information from the focus-detection pixels while capturing image data from the image pixels;

b) determining an exposure period for capturing image data, based on the obtained brightness related information obtained from the focus-detection pixels and capturing the image data while determining the exposure period; and c) halting capturing image data from the image pixels when the determined exposure period has elapsed.

7. The method according to claim 6, the digital camera comprising a focus lens, the method furthermore comprising, before obtaining the brightness related information, focusing the lens based on focus related information obtained from the focus-detection pixels.

8. The method of claim 6, wherein step b) comprises:

d) integrating charge on the focus-detection pixels during a predetermined period;

e) reading brightness related data from the focus-detection pixels;

f) performing statistical processing of the brightness related data from the focus-detection pixels, and g) determining the exposure period as a predefined function of the statistical processing.

9. The method according to claim 6, wherein step b) comprises:

h) integrating charge on the focus-detection pixels during a predetermined period;

i) reading brightness related data from the focus-detection pixels;

j) determining a result by performing a statistical analysis on the brightness related data from the focus-detection pixels, and k) repeating steps h) to k) until the result satisfies a predefined criterion.

10. The method according to claim 9, wherein step j) comprises calculating the sum or the average of the brightness related data from the focus-detection pixels, and the criterion is the result of the test if the sum is larger than a predefined threshold level, or if the average is larger than a predefined threshold level.

11. A method of capturing a movie by a digital camera, the movie comprising a plurality of consecutive images, the digital camera comprising a sensor array having image pixels and focus-detection pixels, the method comprising:

a) capturing image data from the image pixels and simultaneously determining the exposure period based on brightness related information obtained from the focus-detection pixels;

b) repeating step a) until the plurality of images are captured.

* * * * *